United States Patent [19]
Manuel

[11] Patent Number: 4,911,141
[45] Date of Patent: Mar. 27, 1990

[54] HEATING DEVICE ADAPTED TO MAINTAIN AN OPEN HOLE IN ICE

[76] Inventor: Glenn D. Manuel, R.R. 1, Box 182, Avon, Minn. 56310

[21] Appl. No.: 174,778

[22] Filed: Mar. 29, 1988

[51] Int. Cl.⁴ ............................................. F23B 3/00
[52] U.S. Cl. ............................. 126/271.1; 126/271.3
[58] Field of Search .................... 126/271.1, 271.2 R, 126/271.3

[56] References Cited

U.S. PATENT DOCUMENTS

| | | | |
|---|---|---|---|
| 2,747,569 | 5/1956 | Holm et al. | 126/271.3 |
| 3,128,757 | 4/1964 | Borman | 126/271.1 |
| 3,507,268 | 4/1970 | Anderson | 126/271.3 |
| 4,006,732 | 2/1977 | Schumm | 126/271.1 |
| 4,612,910 | 9/1986 | Williams | 126/360 R |
| 4,739,747 | 4/1988 | Johnson | 126/271.1 |

OTHER PUBLICATIONS

*Panfish*, Sternberg et al, 6/1983, p. 138.
*Websters Dictionary*, 7/1987, p. 149.

*Primary Examiner*—Margaret A. Focarino
*Assistant Examiner*—Denise L. Ferensic
*Attorney, Agent, or Firm*—Albert W. Watkins

[57] ABSTRACT

Disclosed is a water spitter for maintaining an opening in ice for the purpose of ice fishing. The water spitter has an outer reservoir placed circumferentially about an inner heating chamber. The heating chamber is internally lined with a coiled tube. The coiled tube passes through the bottom wall of the inner heating chamber and has an inlet located within the outer reservoir. The coiled tube additionally passes out of the inner heating chamber to an outlet which can be directed to the hole in the ice. By filling the outer reservoir with water and filling the inner heating chamber with charcoal or other combustible material and igniting the combustible material, a fisherman can direct a volume and temperature controlled stream of heated water into the hole. Additional features are disclosed which provide advantages of unrestricted portability, compact pack-up, and positional stability during operation.

6 Claims, 2 Drawing Sheets

HEATING DEVICE ADAPTED TO MAINTAIN AN OPEN HOLE IN ICE

BACKGROUND OF THE INVENTION

The present invention relates to ice fishing in general, and specifically to heat type devices for preventing freezing of water in a hole opening through ice.

Prior art heating devices for maintaining open ice fishing holes have not been without significant drawbacks. One type of heating device shown in U.S. Pat. No. 4,612,910 to Williams utilizes a bouyant water proof canister which is floated in the hole, filled with combustible material, and ignited. As the material burns, heat is produced and conducted through the canister. While the water within the ice hole is warmed nicely with this method, the canister is free to bob around in the hole and can easily contact the fishing line which passes through the same hole. Such contact is detrimental and may result in cut or damaged line.

U.S. Pat. No. 4,006,732 to Schumm discloses a gas heater which maintains an open hole and which is anchored to the hole with special legs designed for the purpose. However, the complexity of the Schumm patent is apparent, and the cost of producing such a device can be prohibitive. Schumm also lists several other pertinent patents and the associated drawbacks of each.

Many of the aforementioned disadvantages are overcome by using a device known as a water spitter and disclosed in *Panfish*, by Sternberg et al, 1983, p. 138. The water spitter disclosed in the prior art is disadvantageous in that little control over the throughput of the device (through thermosiphonic action) is available. Additionally, the prior art water spitter is non-transportable, and requires a significant warm-up period to generate a puddle of water sufficient for operation.

SUMMARY OF THE PRESENT INVENTION

The purpose of the present invention is to provide a transportable ice hole heater type maintenance device which is of low cost to produce and operate, and which is designed so as to not interfere with the main goal of fishing. Additionally, the water spitter disclosed is positionally stable and self contained, so as to offer other apparent and not so apparent advantages.

The above described purposes and others are accomplished through the use of an outer reservoir placed circumferentially about an inner heating chamber. The heating chamber is internally lined with a coiled tube. The coiled tube passes through the bottom wall of the inner heating chamber and has an inlet located within the outer reservoir. The coiled tube additionally passes out of the inner heating chamber to have an outlet which can be directed to the hole in the ice. By filling the outer reservoir with water and filling the inner heating chamber with charcoal or other combustible material and igniting the combustible material, a fisherman can direct a volume and temperature controlled stream of heated water into the hole.

These and other features of the invention will be more readily understood upon consideration of the detailed description hereinbelow.

DETAILED DESCRIPTION OF THE INVENTION

Figure 1:
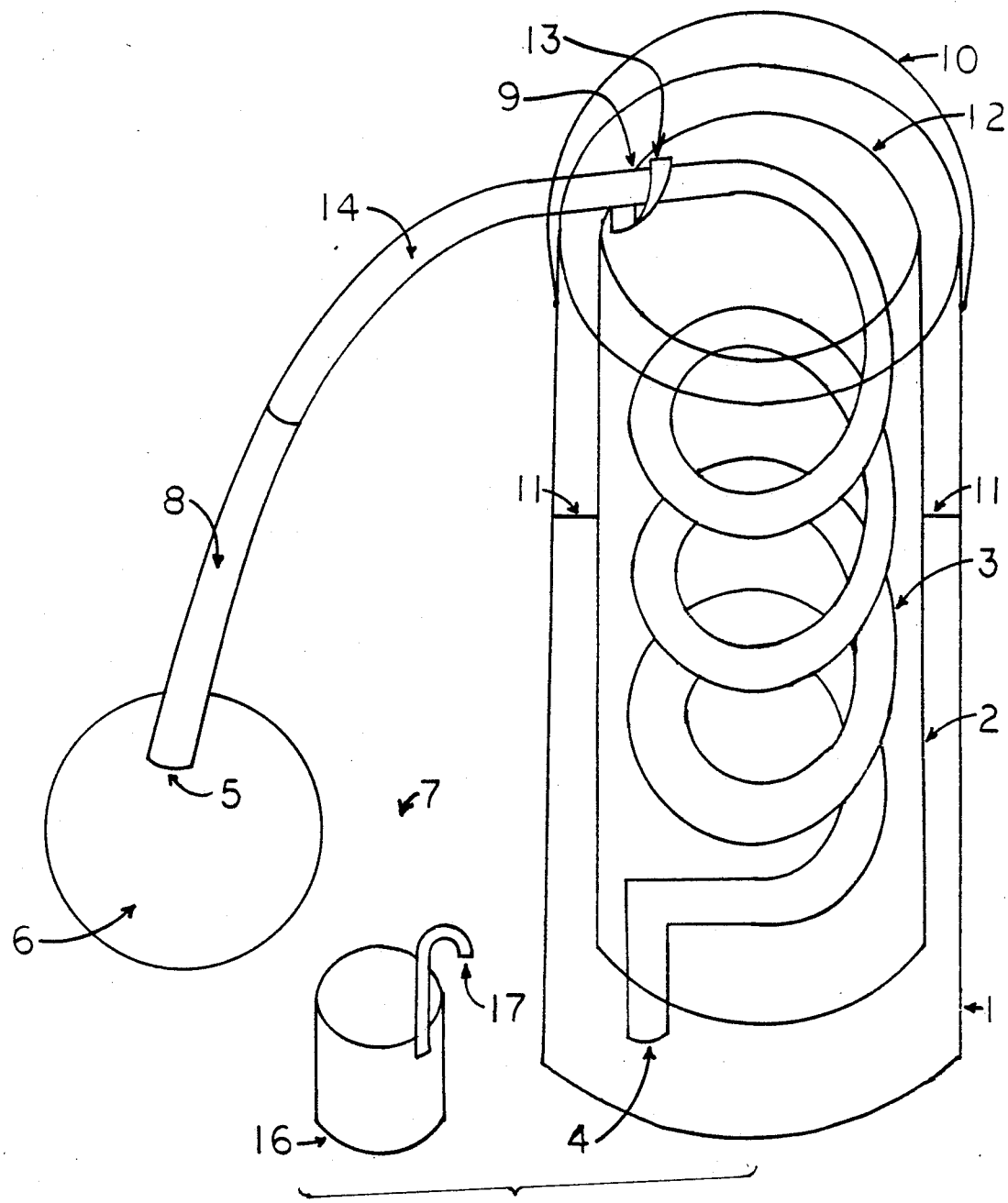
FIG. 1 shows the preferred embodiment of the present invention from a projected view.

Referring to FIG. 1, an outer reservoir 1 is placed circumferentially about an inner heating chamber 2. Rigidly supporting inner heating chamber 2 are bars 11, though any other suitable attaching method would be acceptable. The heating chamber 2 is internally lined with a coiled heat conductive tube 3. The coiled tube 3 passes through the bottom wall of the inner heating chamber 2 and has an inlet 4 located within the outer reservoir 1. The coiled tube 3 passes out of the inner heating chamber 2 through notch 9 to plastic extension tube 14. Plastic extension tube 14 is connected to rubber extension hose 8, extension hose i including an outlet 5 which can be directed to hole 6 in ice 7. Coiled tube 3 is structurally supported by connection by solder or other method to tab 13. By filling the outer reservoir 1 with water and filling the inner heating chamber 2 with charcoal or other combustible material and igniting the combustible material, a fisherman can direct a volume and temperature controlled stream of heated water into the hole 6.

In the preferred embodiment shown, rather than relying solely on the coiled tube 3 to direct the heated water, a flexible extension tube 8 of rubber or other similar material is shown. The extension tube may be used to create a siphonic flow of warmed water directly into the hole 6 merely by inserting outlet 5 down into the water in hole 6. This can be done to create a large and highly effective flow of water into the hole 6. Alternatively, outlet 5 may be set to any reasonable elevation above hole 6, thereby fully controlling the amount and type of heated moisture which travels into hole 6. Additionally, extension tube 14 is illustrated since, in the preferred embodiment, a fisherman can pack all components into reservoir 1 and heating chamber 2 for ease of transport when the water spitter is not in use. A portion of this packing-up is accomplished by making tube 14 removable from coil 3 between reservoir 1 and heating chamber 2.

An additional feature of the present invention made possible by the outer reservoir 1 is the simple handle 10 which may be attached thereto, allowing for easy transport of the entire unit, even while hot from current or past combustion. This handle 10 allows the fisherman to carry the water spitter from one location to another without cooling or ceasing combustion. Additionally, the added efficiently of the heating unit is apparent due to the trapping of heat in the outer reservoir 1 which might otherwise escape directly through the walls of heating chamber 2.

Another feature made possible by the design and nature of the present water spitter arises from the presence of rim 12 at the top of heating chamber 2. This rim 12 provides an excellent support for additional outdoor amenities such as, for example, a cooking grill.

Figure 2:
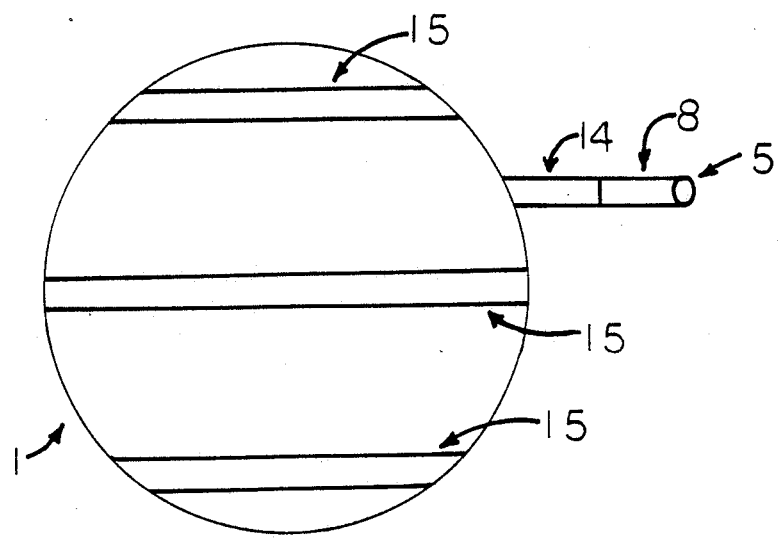
FIG. 2 shows the preferred embodiment of the present invention from a bottom view.

Another feature illustrated in FIG. 1 is reservoir filling can 16 having support handle 17 fixedly attached thereto. Filling can 16 is designed to be of such dimension so as to be insertable within the inside diameter formed by coiled tube 3. By dimensioning thus, the filling can 16 may also be transported fully contained inside of the heating chamber 2, when the water spitter is not in use. The filling can, while not necessary for proper operation of the water spitter, is felt to be of extraordinary convenience for filling outer reservoir 1. In reference to FIG. 2, a bottom view of the water spitter is illustrated. Visible are outer reservoir 1, extension tube 14, extension hose 8, outlet 5, and crossbars 15. Crossbars 15 are in the preferred embodiment fashioned from regular metal rod which is fixedly attached to the bottom of reservoir 1. This is most ideal when reservoir 1 has a rim extending below the bottom plate, such that crossbars 15 may fit into reservoir 1 and not affect the freestanding ability of reservoir 1 on dry flat ground. Crossbars 15 are provided to further add stability to the water spitter when it is operating. Attention is brought to the fact that heating chamber 2, if allowed to directly contact the ice 7, will melt ice 7. This melting will not usually be in an even level manner, but may result in displacement of the water spitter either laterally or radially such that outlet 5 ceases to be directed towards hole 6. While the reservoir 1 provides additional protection against melting and therefore improved stability, some rotation of the water spitter may still be encountered. Crosbars 15 are provided to prevent this possible rotation.

The foregoing description details what the inventor has thought to be the best mode of the present invention. The foregoing description is in no way intended to be limiting, and changes which are within the scope of one of ordinary skill in the art are considered to be encompassed within the foregoing description.

Having thus described my invention, I claim:

1. A water spitter comprised by a means for providing thermal energy, a means for retaining a fluid having a first fluid capacity, and a means for transporting said fluid, said transporting means having a second fluid capacity substantially smaller than said first fluid capacity, said transporting means being in generally more intimate thermal contact with said thermal energy means than said retaining means, wherein said transporting means is coupled both to said retaining means and to said thermal energy means and includes an outlet, whereby said fluid is automatically transported by said transporting means at a rate of transport from said retaining means to said outlet and is simultaneously provided with said thermal energy.

2. The water spitter of claim 1 wherein said retaining means has a fluid content prior to said automatic transporting of said fluid, and a fluid content during said automatic transporting, wherein said fluid content during transporting is reduced from said fluid content prior to said automatic transporting by an amount which is equal to the fluid amount which has been automatically transported.

3. The water spitter of claim 2 additionally comprising a first handle means operatively connected to said fluid retaining means, said handle means useable by a person to enable carrying of said water spitter by said persons.

4. The water spitter of claim 2 wherein said means for retaining a fluid is substantially open from at least one direction to outside air so as to limit the potential to overheat when said fluid retaining means is void of said fluid.

5. The water spitter of claim 2 wherein said means for retaining a fluid is coupled to said thermal energy means to receive a quantity of thermal energy therefrom, said fluid retained by said retaining means being heatable above an ambient temperature by said quantity of said thermal energy being received, wherein said fluid transported by said transporting means is simultaneously heated to a temperature greater than a temperature of said retained fluid.

6. The water spitter of claim 2 wherein said means for retaining a fluid substantially surrounds said thermal energy means.

* * * * *